Figure 1:
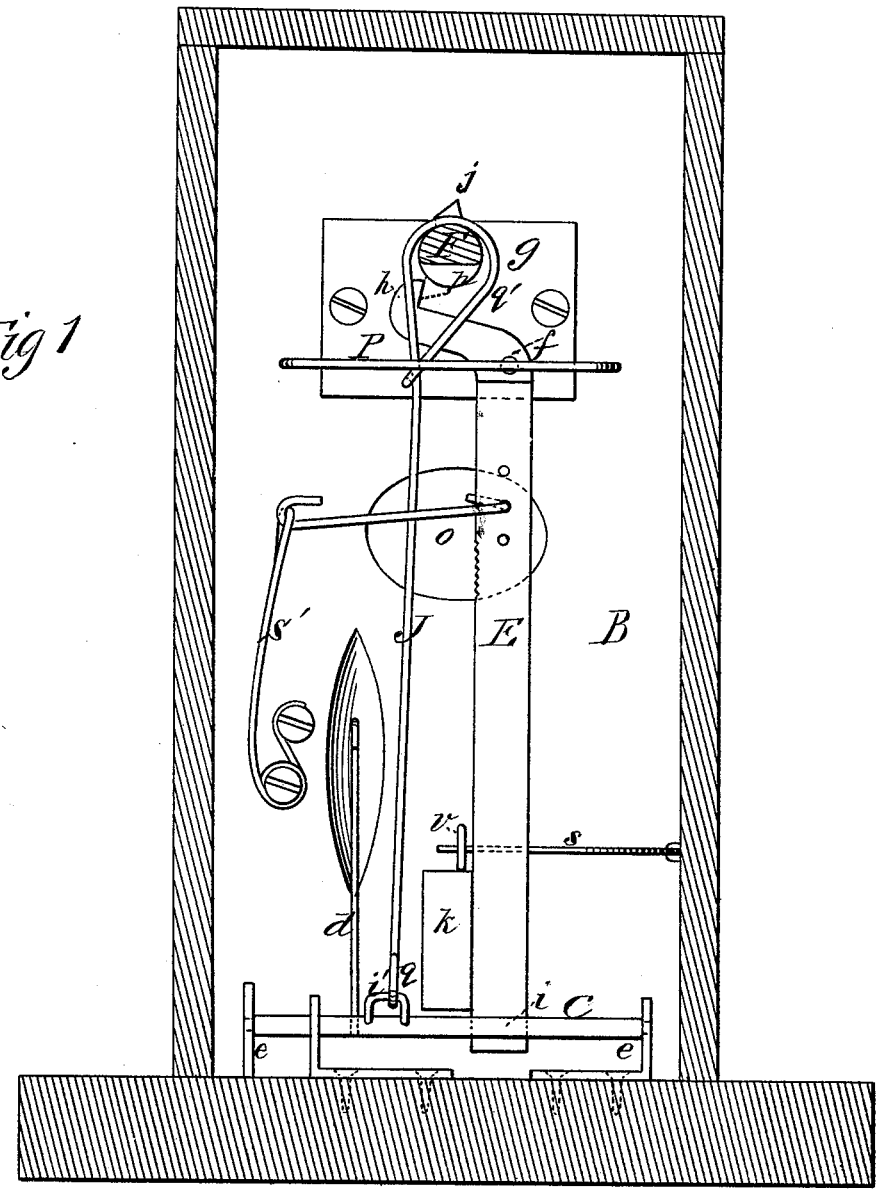

2 Sheets—Sheet 1.

J. QUIGLEY.
ANIMAL-TRAP.

No. 182,957. Patented Oct. 3, 1876.

WITNESSES
Villette Anderson
F. J. Masi

INVENTOR
John Quigley
by E. W. Anderson
ATTORNEY.

2 Sheets—Sheet 2.
J. QUIGLEY.
ANIMAL-TRAP.
No. 182,957.          Patented Oct. 3, 1876.
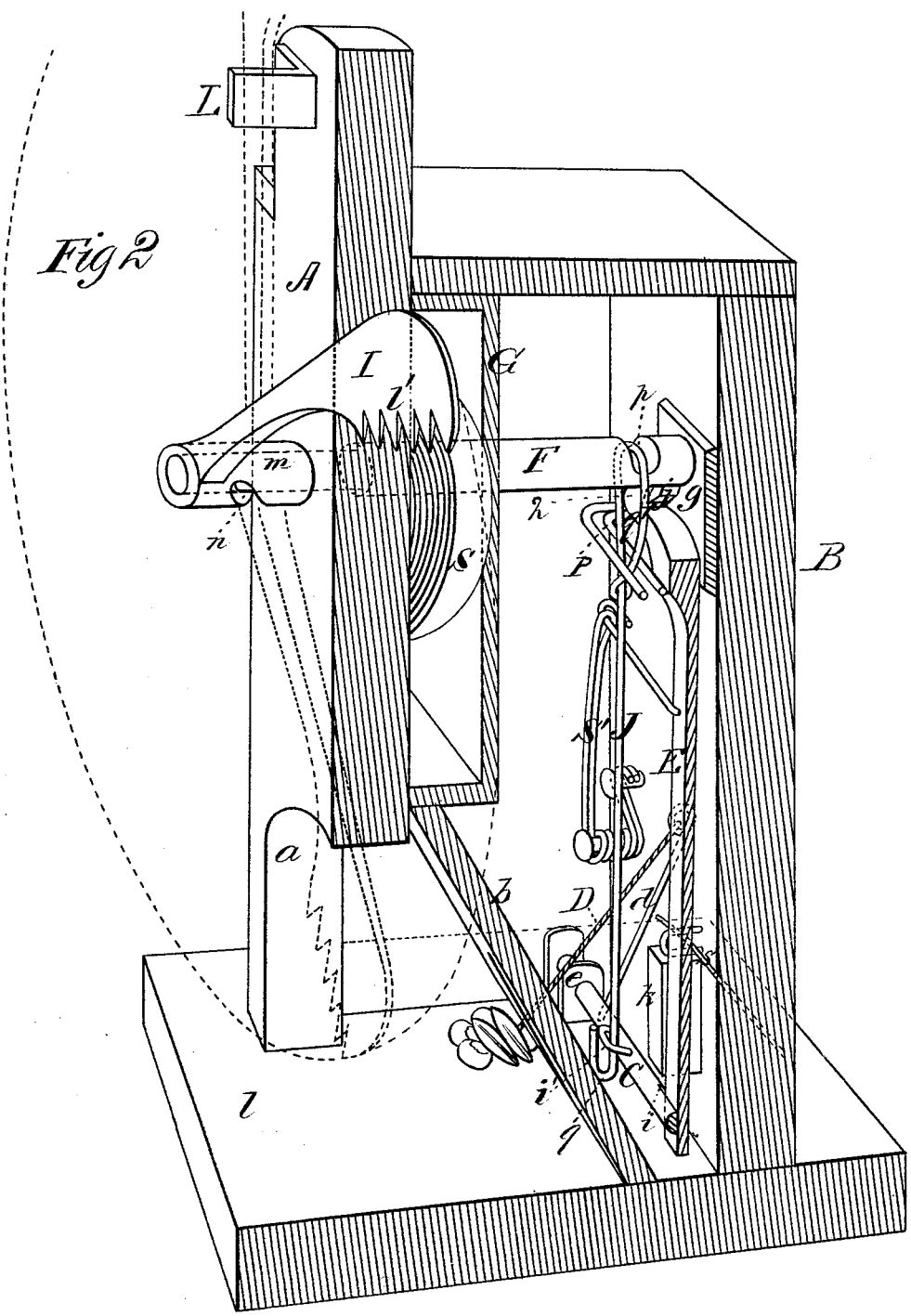
WITNESSES
Villette Anderson
F. J. Masi
INVENTOR
John Quigley.
by E. W. Anderson,
ATTORNEY

UNITED STATES PATENT OFFICE.

JOHN QUIGLEY, OF WINONA, MINNESOTA.

IMPROVEMENT IN ANIMAL-TRAPS.

Specification forming part of Letters Patent No. 182,957, dated October 3, 1876; application filed June 24, 1876.

*To all whom it may concern:*

Be it known that I, JOHN QUIGLEY, of Winona, in the county of Winona and State of Minnesota, have invented a new and valuable Improvement in Animal-Traps; and I do hereby declare that the following is a full, clear, and exact description of the construction and operation of the same, reference being had to the annexed drawings, making a part of this specification, and to the letters and figures of reference marked thereon.

Figure 1 of the drawings is a vertical cross-section of my improved trap, and Fig. 2 is a perspective section of the same.

This invention has relation to improvements in animal-traps; and it consists in the arrangement and novel construction, in connection with a spring-actuated striker, of a latch, a catch, and a trigger, all as hereinafter more fully explained.

In the annexed drawings, the letter A designates the front and B the rear walls of my improved trap, which, when combined with side and top walls, will constitute the case of the implement. Walls A B may be erected on a broad base, and the former will have at its lower part an opening, $a$, of sufficient size, through which vermin will have access to the bait. The mechanism of the implement will be concealed from the view of an animal approaching the opening $a$ by an inclined guard, $b$, having a vertical slot, through which a cord or wire, D, having the bait upon its outer end, will pass. The inner end of this cord or wire will be connected to an arm, $d$, projecting upward from a rock-shaft, C, which is horizontally arranged, and has its bearings in standards $e$ projecting upward from the base. This shaft is in close proximity to the rear wall B of the case, and is provided upon its side next the wall with a notch, $i$, having its end walls at right angles to the length of the shaft, and being of sufficient length to receive the end of a flat vertically-vibrating latch, E, pivoted at $f$ to a strong metallic plate, $g$, rigidly secured to the rear wall B of the casing. Shaft C is also provided with an open loop, $i'$, the object of which will hereinafter appear. $h$ represents a tooth or latch formed on the upper end of the lever E above its fulcrum, and $j$ is a spur or stop projecting from a horizontally-arranged shaft, F, having its bearings in the front and rear walls of the casing, and projecting through the former a considerable distance. Upon the inner side of the front wall A is a suitable box, G, containing a strong coiled spring, S, the inner end of which is rigidly secured to the shaft F and the outer end to a strong metallic bolt projecting from the said wall. When the shaft F is rotated backward in its bearings the spring S will be wound up, the lever E being previously disengaged from the locking-notch $i$ in the rock-shaft C. Access will be had to the said lever E through an opening, $o$, made in the rear wall of the casing. When the spring S is sufficiently wound up the lever E is to be released. It will then be drawn by a suitable spring, S', against a stop, $k$, on the rear wall of the casing. In this position it will be vertical, and will be re-engaged with the notch $i$ on the rock-shaft by a strip-spring, $s$, secured to the casing at one end and extending behind the said lever. At the same time the latch $h$ on the upper end of the lever E will become engaged with the spur $j$ on the shaft F, thereby holding it against rotating, and storing up the power of the spring S in a proper condition for actuating the striker I. This striker is intended to kill the vermin, and is applied upon that end of the main shaft F which projects beyond the front wall of the casing. It consists of a metallic blade of sufficient length to sweep past the aperture $a$ leading to the bait, just clearing the base $l$, and may have a serrated edge, $l'$, if desired. This blade is provided with a tubular shank, $m$, adapted to be passed onto the cylindrical end of the main shaft F, and having an oblique slot, $n$. The shank $m$ is secured to the shaft by means of a screw, which passes through the slot $n$ into the said shaft. The main shaft F is provided with a notch, $p$, near the spur $j$, and is connected to the rock-shaft C by means of a resetting-rod, J, having upon its lower end a hook, $q$, adapted to engage with the loop $i'$ on the rock-shaft, and upon its upper end a loop, $q'$, embracing the main shaft.

The operation of my trap is as follows: The animal, scenting the bait, will pass his head through the aperture $a$ in the case-front, seize upon the bait, and attempt to escape with it. This will draw the arm $d$ forward, causing the rock-shaft C to turn in its bearings, when the catch-lever E will escape from the notch $i$, releasing the main shaft F and spring S, when the recoil of the latter will cause the striker I to sweep past the opening $a$ with great force, instantly killing the animal. When the striker is set, the loop $q'$ is engaged in the notch $p$ of the main shaft F, and the said resetter-rod depends loosely from it, but when the said shaft is rotated it will immediately tighten the rod, and, acting after the manner of an eccentric, will raise the arm $d$ into the position shown in Fig. 1, bringing the notch $i$ on the rock-shaft into a vertical position, and re-engaging the lever E therein, thus immediately arresting the main shaft and reserving the unexpended power of the spring for a future operation. While the rotation of the shaft F continues the striker I has free movement, but as soon as the said rotation is arrested, the said striker will vibrate into contact with a metallic stop, L, rigidly secured to the casing, when its natural momentum will cease. It will then gravitate downward, and, owing to the diagonal slot $n$ in its shank, $m$, will swing outward from the casing, so that when again actuated by the rotation of the shaft F it will not come in contact with the said stop L until the shaft F has made a complete revolution and has been again arrested. This independent stop device for the striker I relieves the mechanism of the trap from undue strain, when the rotation of the shaft F is suddenly arrested. This operation will be repeated as often as an animal seizes the bait and the force of the spring remains unexpended.

The resetter-rod J will be held in proper position for engaging with the notch $p$ of the main shaft F by means of two spaced guides, P, between which the said rod is held. The spring $s$ is prevented from springing out by being passed through a staple, $v$.

What I claim as new, and desire to secure by Letters Patent, is—

1. In an animal-trap, the main shaft F, having the notch $p$ and stop $j$, in combination with the vibrating bar E, having the latch $h$, the rock-shaft C, having the notch $i$ and the loop $i'$, and the resetter-rod J, substantially as specified.

2. In combination with the spring-actuated main shaft F, carrying the striker I, the latch-bar E, adapted to engage with said shaft, the notched let-off rock-shaft C, and the spring S', substantially as specified.

3. In combination with the notched rock-shaft C and latch-bar E, the spring S' for retracting the said bar, and the spring $s$ for throwing it into engagement with the said shaft, substantially as specified.

4. In combination with the spring-actuated main shaft F, the striker I, having tubular shank, with oblique slot $n$, adapted to be passed over the end of the said shaft, substantially as specified.

5. In combination with the self-adjusting striker I, constructed as described, and the spring-actuated shaft F carrying the said striker, the stop L, substantially as specified.

6. The rock-shaft C and trigger-arm $d$, in combination with a cord, I, and a slotted inclined guard, $b$, substantially as specified.

7. In combination with the resetter-rod J, the guides P for holding it in proper relation to the notched main shaft F, substantially as specified.

In testimony that I claim the above I have hereunto subscribed my name in the presence of two witnesses.

JOHN QUIGLEY.

Witnesses:
R. R. BRIGGS,
C. G. MAYBURY.